(12) United States Patent
Chang et al.

(10) Patent No.: US 12,728,888 B1
(45) Date of Patent: Sep. 8, 2026

(54) MACHINE LEARNING TECHNIQUES FOR ENCODING DRIVING SCENARIOS

(71) Applicant: Zoox, Inc., Foster City, CA (US)

(72) Inventors: Yan Chang, Sunnyvale, CA (US); Alec Jacob Farid, Commack, NY (US); Aaron Huang, San Francisco, CA (US); Peter Scott Schleede, El Dorado Hills, CA (US)

(73) Assignee: Zoox, Inc., Foster City, CA (US)

( * ) Notice: Subject to any disclaimer, the term of this patent is extended or adjusted under 35 U.S.C. 154(b) by 166 days.

(21) Appl. No.: 18/619,060

(22) Filed: Mar. 27, 2024

(51) Int. Cl.

| | |
|---|---|
| ***G06N 20/00*** | (2019.01) |
| ***B60W 50/00*** | (2006.01) |
| ***B60W 60/00*** | (2020.01) |
| ***G07C 5/02*** | (2006.01) |

(52) U.S. Cl.
CPC ...... *B60W 60/001* (2020.02); *B60W 50/0098* (2013.01); *G06N 20/00* (2019.01); *G07C 5/02* (2013.01)

(58) Field of Classification Search
CPC ............ B60W 60/001; B60W 50/0098; G06N 20/00; G07C 5/02
See application file for complete search history.

(56) References Cited

U.S. PATENT DOCUMENTS

| | | | | |
|---|---|---|---|---|
| 10,678,253 | B2 * | 6/2020 | Zeng | B60W 50/14 |
| 2017/0061804 | A1 * | 3/2017 | Navarro Felix | G08G 5/34 |
| 2020/0265247 | A1 * | 8/2020 | Musk | G06V 20/58 |
| 2020/0366941 | A1 * | 11/2020 | Sugio | H04N 19/96 |
| 2024/0182082 | A1 * | 6/2024 | Chen | B60W 60/0011 |
| 2024/0257535 | A1 * | 8/2024 | Coimbra De Andrade | G06V 20/597 |
| 2025/0074443 | A1 * | 3/2025 | Sethu | B60K 35/28 |
| 2025/0296586 | A1 * | 9/2025 | Zahid | B60W 50/10 |

* cited by examiner

*Primary Examiner* — Ashley L Redhead, Jr.
(74) *Attorney, Agent, or Firm* — Lee & Hayes, P.C.

(57) ABSTRACT

Techniques include generating a driving scenario representation based on another driving scenario representation and a modification representation. In examples, a method includes receiving a first driving scenario; receiving a second driving scenario; providing the first driving scenario and the second driving scenario to a first model; receiving, from the first model, a first representation associated with the first driving scenario and a second representation associated with the second driving scenario; determining a modification representation representing a difference measure associated with the first representation and the second representation; training the first model based at least in part on the modification representation; and providing the first model to a second system. The second system may be configured to modify a third driving scenario based at least in part on the first model to determine a fourth driving scenario, and control a vehicle based at least in part the fourth driving scenario.

20 Claims, 5 Drawing Sheets

MACHINE LEARNING TECHNIQUES FOR ENCODING DRIVING SCENARIOS

BACKGROUND

Simulated driving scenarios representing vehicle environments are useful for various applications such as testing and validating autonomous vehicle controllers. For example, simulated environments may cover a wide range of potential scenarios a system may encounter during operation, regardless of the probability of the scenario happening. However, generating a wide variety of driving scenarios to rigorously test controllers can be challenging.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
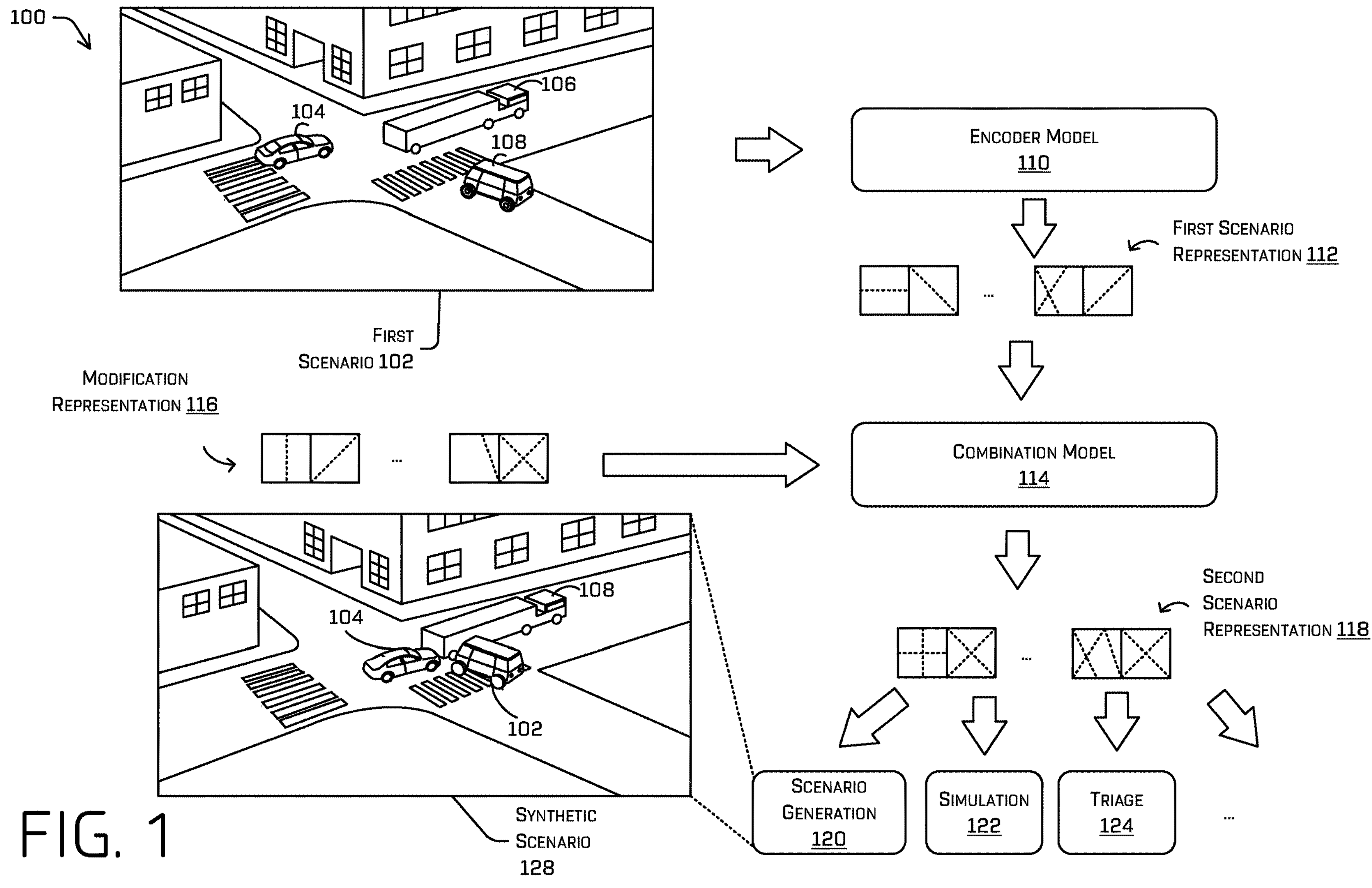
FIG. 1 depicts an example environment for determining a modified scenario representation based on a modification representation.

Techniques for generating a simulated driving scenario representation based on another driving scenario representation and a modification representation that represents a difference between two driving scenario representations are described herein. For example, in some cases, a first model (e.g., a machine learning model such as an encoder model) is configured to receive a first driving scenario and determine a representation (e.g., an embedding and/or encoding) associated with the first driving scenario. After the first model determines the first scenario representation, an example system may determine a second scenario representation by combining (e.g., determining an aggregation of, such as by arithmetically summing) the first scenario representation and a modification representation (e.g., a modification representation) that is associated with a desired modification in the first scenario representation. For example, the system may combine the first scenario representation with a modification representation associated with a collision (e.g., associated with a collision having a particular collision severity). By combining the first scenario representation and the collision representation, the system may determine a second scenario representation. The second scenario representation may share one or more common attributes with the first representation, but may be different in one or more attributes. The different attribute(s) may be determined based on the combination of the first representation and the second representation.

In some cases, the techniques described herein relate to determining a second scenario representation by combining a first scenario representation and a modification representation. The second scenario representation may then be used to perform one or more downstream tasks. For example, in some cases, the second scenario representation may be processed by a second model (e.g., a machine learning model such as a decoder model) to generate a synthetic driving scenario. In examples, the first scenario representation may represent a driving log (e.g., a real-world driving log and/or a synthetic driving log), while the modification representation may represent an event of interest (e.g., a collision) and/or a condition of interest (e.g., the presence of a red light at a particular location in the corresponding environment associated with the first scenario representation). In some of these examples, the second scenario representation resulting from combination (e.g., summation) of the first scenario representation and the modification representation may be used to determine a synthetic driving scenario. The synthetic driving scenario may represent the driving log as modified in accordance with the event and/or condition of interest (e.g., as modified to include the event and/or condition of interest, as modified to include the event and/or condition of interest, and/or the like).

As another example, in some cases, the second scenario representation may be used to determine whether the representation indicates one or more driving conditions of interest (e.g., an undesirable behavior by an object and/or an undesirable driving behavior by a vehicle). In examples, the second scenario representation may represent a transformation of a driving log corresponding to the first scenario representation, where the transformation may be determined based on the modification representation. In some of these examples, the second scenario representation may be processed to determine whether at least one object (e.g., vehicle and/or pedestrian) represented in the driving log will exhibit an undesirable behavior if the driving log is transformed in accordance with the modification representation. For example, the second scenario representation may be processed to determine whether one or more dynamic object(s) represented by the driving log is expected to exhibit an undesirable behavior if the driving log is transformed to include an event and/or condition of interest (e.g., to include a collision of a defined collision severity).

As another example, in some cases, the second scenario representation may be used to perform one or more driving simulation operations, for example driving simulation operation(s) configured to determine whether a vehicle controller associated with a simulated vehicle involved in the simulation is associated with one or more deficiencies. In examples, after the second scenario representation is generated, a simulation engine may process the second simulation representation to determine one or more simulated behaviors of one or more dynamic object(s) associated with the second simulation representation. The simulation engine may then generate simulation outcome data that represents whether a vehicle controller associated with a simulated vehicle is associated with one or more deficiencies. For example, the second scenario representation may represent a transformation of a driving log in accordance with an event and/or a condition of interest (e.g., in accordance with a condition of interest). The simulation engine may be configured to process the transformation and determine that, for example, a collision avoidance mechanism of a vehicle controller exhibits one or mode deficiencies in the transformed scenario.

Regardless, generation of the second representation by modification of the first may enable testing of one or more components of the vehicle in simulation to uncommon events, events which may have related safety issues (e.g., a collision), or otherwise to ensure the component is able to safely respond in a wide range of scenarios, regardless of the probability of occurrence. In some cases, modifying scenario representations (e.g., rather than directly modifying scenarios) enables testing multiple scenarios in parallel. For example, the same collision representation may be added to multiple different scenarios simultaneously.

In some cases, the techniques described herein relate to determining a first and a second scenario representation based on associated first and second scenarios and computing a modification representation based on the two scenario representations (e.g., based on a subtraction of one of the two scenario representations from the other). The computed modification representation may then be used to perform one or more downstream tasks. For example, in some cases, the computed modification representation may be used to determine whether an event and/or condition of interest (e.g., an undesirable behavior by an object and/or an undesirable driving behavior by a vehicle) has occurred between a time associated with the first scenario representation and a time associated with the second scenario representation. In examples, a system may be configured to, during the operation of a vehicle (e.g., an autonomous vehicle), determine a modification representation between a pair of (e.g., consecutive) scenario representations, for example the scenario representation associated with the most-recent time at which sensor data associated with the vehicle's environment is obtained and sensor data associated with a time preceding that most recent-time (e.g., with a second-most recent-time at which sensor data associated with the vehicle's environment is obtained). The example system may then be configured to determine whether the modification representation matches a representation associated with an event and/or condition of interest (e.g., with a collision). If the system determines that the modification representation matches the representation associated with an event and/or condition of interest, the example system may determine that the event and/or condition of interest has occurred in the vehicle's environment (e.g., a collision has occurred in the vehicle's environment). The example system then may update a trajectory associated with the vehicle based on the detection of the event and/or condition of interest (e.g., may modify the vehicle's trajectory to avoid the collision area, may bring the vehicle to a halt, may require manual control of the vehicle, and/or the like).

As another example, in some cases, the computed modification representation may be compared with a set of labeled modification representations. If the computed modification representation matches one of the labeled modification representation(s), then an example system may determine that at least one of the first or the second scenario representations depicts a driving condition label associated with the matching labeled modification representation. In examples, an example system (e.g., a triage system) may be configured to determine a modification representation based on a first scenario representation corresponding to a driving scenario that is known to not include an event and/or a condition of interest (e.g., a collision) and a second scenario representation. The system may then compare the modification representation with a modification representation associated with the event and/or condition of interest. If the system determines that the modification representation matches the representation associated with an event and/or condition of interest, the example system may determine that the driving scenario corresponding to the second scenario representation is associated with an event and/or condition of interest (e.g., involves a collision).

In some cases, the techniques described herein relate to at least one of the following: an encoder model, a difference model, a combination model, or a decoder model. The encoder model may be configured to process data (e.g., feature data) associated with a driving scenario to generate a scenario representation associated with the driving scenario. The difference model may be configured to process two representations (e.g., two scenario representations) and determine a modification representation based on the two representations. The combination model may be configured to process two representations (e.g., two scenario representations, a scenario representation and a modification representation, and/or the like) and determine a combined representation based on the two representations. The decoder model may be configured to process a representation (e.g., a scenario representation and/or a combined representation) and determine a synthetic driving scenario based on the processed representation. The techniques described herein relate to various model architectures that each includes a subset or all of the noted four models.

For example, in some cases, the techniques described herein relate to a model architecture that includes an encoder model and a combination model. In this example architecture, the encoder model may be configured to process data associated with a first driving scenario to determine a scenario representation, while the combination model may be configured to combine the scenario representation determined by the encoder model along with a modification representation to determine a combined representation. The modification representation may represent an event and/or condition of interest, and the combined representation may represent a second driving scenario generated by transforming the first driving scenario in accordance with the event and/or condition of interest. The combined representation may be used to perform a driving simulation, to determine whether the combined representation is associated with a behavior of interest by a dynamic object, to determine whether another scenario representation (e.g., a scenario representation generated by processing sensor data associated with a vehicle's environment) corresponds to the event and/or condition associated with the modification representation, and/or the like.

As another example, in some cases, the techniques described herein relate to a model architecture that includes an encoder model, a combination model, and a decoder model. In this example architecture, the encoder model may be configured to process data associated with a first driving scenario to determine a scenario representation, while the combination model may be configured to combine the scenario representation determined by the encoder model along with a modification representation to determine a combined representation. Furthermore, the decoder model may be configured to process the combined representation to generate a synthetic driving scenario. The synthetic driving scenario may be determined based on a transformation of the first driving scenario in accordance with an event and/or condition of interest, where the event and/or condition of interest may be represented by the modification representation. The synthetic driving scenario may be used to perform a driving simulation, to determine whether the synthetic driving scenario is associated with a behavior of interest by a dynamic object, to determine whether another scenario (e.g., a scenario generated by processing sensor data associated with a vehicle's environment, such as a driving log captured based on the sensor data) corresponds to the event and/or condition associated with the modification representation, and/or the like.

As another example, in some cases, the techniques described herein relate to a model architecture that includes an encoder model, a difference model, and a combination model. In this example, the encoder model may be configured to process data associated with a first driving scenario, data associated with a second driving scenario, and data associated with a third driving scenario to determine a first, a second, and a third scenario representation, respectively. The difference model may be configured to determine a modification representation based on the first and the second representation. The combination model may be configured to determine a combined representation based on the third representation determined by the encoder model and the modification representation determined by the difference model. The combined representation may represent a transformation of the third driving scenario in accordance with a computed difference of the first and second driving scenarios. For example, the first driving scenario may be associated with a vehicle environment at a time before a collision, while the second driving scenario may be associated with the vehicle environment at a time after the collision. In this example, the combined representation may represent a transformation of the third driving scenario to include the collision in that scenario. Once generated, the combined representation may be used to perform a driving simulation, to determine whether the combined representation is associated with a behavior of interest by a dynamic object, to determine whether another scenario representation (e.g., a scenario representation generated by processing sensor data associated with a vehicle's environment) corresponds to the event and/or condition associated with the modification representation, and/or the like.

As another example, in some cases, the techniques described herein relate to a model architecture that includes an encoder model, a difference model, a combination model, and a decoder model. In this example, the encoder model may be configured to process data associated with a first driving scenario, data associated with a second driving scenario, and data associated with a third driving scenario to determine a first, a second, and a third scenario representation, respectively. The difference model may be configured to determine a modification representation based on the first and the second representation. The combination model may be configured to determine a combined representation based on the third representation determined by the encoder model and the modification representation determined by the difference model. Furthermore, the decoder model may be configured to process the combined representation to generate a synthetic driving scenario. The synthetic driving scenario may be determined based on a transformation of the first driving scenario in accordance with an event and/or condition of interest, where the event and/or condition of interest may be determined based on a difference measure associated with the first and the second driving scenarios. For example, the first driving scenario may be associated with a vehicle environment at a time before an undesirable driving behavior, while the second driving scenario may be associated with the vehicle environment at a time after the undesirable driving behavior. In this example, the synthetic driving scenario may represent a transformation of the third driving scenario to include the undesirable driving behavior. Once generated, the synthetic driving scenario may be used to perform a driving simulation, to determine whether the synthetic driving scenario is associated with a behavior of interest by a dynamic object, to determine whether another scenario (e.g., a scenario generated by processing sensor data associated with a vehicle's environment, such as a driving log captured based on the sensor data) corresponds to the event and/or condition associated with the modification representation, and/or the like.

Accordingly, in some cases, the techniques described herein relate to an encoder model that is configured to process data associated with a driving scenario to generate a scenario representation. A driving scenario may represent one or more states (e.g., positions, orientation(s), and/or velocit(ies)) associated with one or more objects in a real-world and/or simulated environment. For example, a driving scenario may represent one or more initial states and/or one or more behaviors associated with one or more objects in a real-world and/or simulated environment. In some cases, a driving scenario may be determined based on log data captured by one or more sensors (e.g., one or more cameras) associated with a vehicle. In some cases, a driving scenario may be a synthetic scenario that is generated based on one or more scenario parameters and/or based on performing one or more decoder operations performed on a representation (e.g., a scenario representation, a combined representation determined based on two representations, and/or the like).

In some cases, an encoder model may be configured to process data associated with a driving scenario to generate a scenario representation. A scenario representation may be a fixed-size representation of a scenario (e.g., a representation with a fixed number of dimensions, such as a fixed-size vector and/or matrix). In some cases, the encoder model processes input data including the feature data to determine output data including the scenario representation. In some cases, given a driving scenario that is associated with M objects (e.g., M dynamic objects), the scenario representation includes at least M segments, where each of the M segments represents a state (e.g., an initial state and/or a subsequent state), a behavior, an event of interest occurring with respect to, and/or a condition of interest with respect to a respective one of the M objects. For example, in some cases, the scenario representation may be generated by: (i) processing M feature data sets each associated with one of the M objects to generate M representation segments each associated with one of the M objects, and (ii) combining the M representation segments.

In some cases, the encoder model is trained using one or more training techniques associated with one or more loss functions. As used herein, "training" a model may include at least one of initial training of the model (e.g., training of the model from scratch, such as updating the initial parameter value(s) associated with the model) or fine-tuning an already-trained model. In some cases, the encoder model is trained using a training technique that includes: (i) processing a first driving scenario using the encoder model to determine a first scenario representation, (ii) processing the first scenario representation using a decoder model to determine a synthetic driving scenario, (iii) determining a loss function based on a deviation between the first driving scenario and the synthetic driving scenario, and (iv) training the encoder model in accordance with the loss function. In addition to the encoder model, the decoder model may be also trained in accordance with the loss function. In some cases, training one or more models in accordance with a loss function includes updating parameter(s) of the model(s) to decrease (e.g., minimize, such as locally and/or globally minimize) the loss function.

In some cases, the encoder model is trained using a training technique that includes: (i) processing a first driving scenario using the encoder model to determine a first scenario representation, (ii) processing a second driving scenario using the encoder model to determine a second scenario representation, (iii) combining the first scenario representation and a modification representation associated with a difference between the first and second driving scenarios (e.g., an event and/or condition of interest that is present in one scenario but not the other) to determine a combined representation, (iv) determining a loss function based on a deviation between the second scenario representation and the combined representation, and (v) training the encoder model in accordance with the loss function. In some cases, in addition to the encoder model, a combination model used to determine the combined representation is also trained in accordance with the loss function.

In some cases, the encoder model is trained using a training technique that includes: (i) processing a first driving scenario using the encoder model to determine a first scenario representation, (ii) processing a second driving scenario using the encoder model to determine a second scenario representation, (iii) combining the first scenario representation and a modification representation associated with a difference between the first and second driving scenarios (e.g., an event and/or condition of interest that is present in one scenario but not the other) to determine a combined representation, (iv) processing the combined representation using a decoder model to determine a synthetic driving scenario, (v) determining a loss function based on a deviation between the first driving scenario and the synthetic driving scenario, and (vi) training the encoder model in accordance with the loss function. In some cases, in addition to the encoder model, the decoder model and/or a combination model used to determine the combined representation is also trained in accordance with the loss function.

In some cases, the encoder model is trained using a training technique that includes: (i) processing a first driving scenario using the encoder model to determine a first scenario representation, (ii) processing a second driving scenario using the encoder model to determine a second scenario representation, (iii) computing a modification representation representing a difference between the first and second driving scenarios (e.g., an event and/or condition of interest that is present in one scenario but not the other), (iv) determining a loss function based on a deviation between the computed modification representation and a representation of the difference between the first and the second driving scenarios (e.g., a collision representation), and (vi) training the encoder model in accordance with the loss function. In some cases, in addition to the encoder model, at least one of the following is trained in accordance with the loss function: a combination model used to determine the combined representation or a difference model used to determine the modification representation.

In some cases, an event and/or a condition of interest may be associated with a representation (e.g., a predefined representation). For example, a collision having a particular severity may be associated with a particular representation (e.g., an embedding, such as an all-zero embedding). As another example, an event of interest associated with a first action to be performed by a first object in an environment and a second action to be performed by a second object in the environment may correspond to a representation (e.g., an embedding) that assigns the first action using a representation segment (e.g., a set of bit values) associated with the first object and assigns the second action using a representation segment associated with the second object. As another example, an event of interest may be associated with a representation that indicates (e.g., via one-hot encoding) which object(s) and/or portions of (e.g., pixels associated with) the environment will be affected by the event of interest. As another example, a collision between two vehicles may be associated with a representation that indicates the objects involved, the severity of the collision, and/or the region of impact on each vehicle. This representation may, for example, be a vector with segments encoding one-hot identifiers for each vehicle, scalar values indicating severity, and bitmaps marking damage locations on each vehicle. As another example, a representation for a pedestrian entering the roadway unexpectedly may indicate the pedestrian object, a magnitude of the incursion speed and/or distance, and a one-hot encoding of which region of the roadway is impacted. As another example, a representation for an event and/or condition may have a set of values (e.g., bits) each corresponding to a discrete portion (e.g., a voxel and/or pixel) associated with the environment. Each value may represent whether the corresponding discrete portion is affected by and/or associated with the event and/or condition of interest.

In some cases, to determine the embedding associated with a particular event and/or condition, the system may determine a representative embedding for an event and/or condition of interest and determine the distance between a given embedding and this representative embedding. In some cases, given E representative embeddings associated with E events and/or conditions, the event and/or condition whose representative embedding is the closest to a given embedding may be assigned to the given embedding (e.g., to the driving scenario associated with the given embedding).

Accordingly, in some cases, an event and/or a condition of interest may be associated with a predefined representation. In some cases, such a predefined representation may be used to train the encoder model. For example, a training technique may include: (i) receiving a first and a second scenarios that are different in that one of the scenarios is associated with the event and/or condition of interest while the other scenario is not, (ii) processing the two scenarios using an encoder model to generate a first and a second scenario representation respectively, (iii) determining a modification representation based on the first and the second scenario representations, (iv) determining a loss function based on a deviation associated with the modification representation and a predefined representation associated with the event and/or condition of interest, and (v) training the encoder model in accordance with the loss function. The predefined representation may be determined based on (e.g., based on the subtraction of) an embedding associated with a driving scenario that includes the event and/or condition of interest and an embedding associated with a driving scenario that does not include the event and/or condition of interest. The difference associated with the two driving scenarios may be based on the event and/or condition of interest. For example, the first scenario may include a collision while the second scenario may not include a collision (e.g., may be collision-free). As another example, the first scenario may include a collision having a particular collision severity while the second scenario may not include a collision having the particular collision severity. As another example, the first scenario may include a rainy condition while the second scenario may not be associated with the rainy condition. As another example, the first scenario may be a log associated with a time prior to a particular collision, while the second scenario may be log associated with a time after the particular collision. As another example, the first scenario may be a log associated with a time prior to a particular rainy condition, while the second scenario may be log associated with a time after the particular rainy condition. As another example, the first scenario may be a log associated with a time prior to a pedestrian entry into roadway, while the second scenario may be log associated with a time after the pedestrian entry.

In some cases, the techniques described herein relate to a difference model that is configured to process two representations (e.g., two scenario representations) to generate a modification representation. The modification representation may represent a difference associated with the corresponding driving scenarios associated with the two representations. For example, the modification representation may represent an event and/or condition of interest that is present in relation to a first driving scenario associated with the first scenario representation but not in relation to a second driving associated with the second scenario representation. In some cases, the difference model is configured to perform one or more arithmetic operations (e.g., a subtraction operation, such as a vector and/or matrix subtraction operation) on the two representations to generate the modification representation. In some cases, the difference model is configured to process the two representations using a trained machine learning model to generate the modification representation. The modification representation may represent a behavior of a vehicle and/or an object, a collision, and/or a position shift associated with a vehicle and/or an object.

In some cases, the techniques described herein relation to a combination model that is configured to process two representations (e.g., two scenario representations, a scenario representation and/or a modification representation) to generate a combined representation. The combined representation may represent a transformation of a first scenario representation based on the modification representation. In some cases, the difference model is configured to perform one or more arithmetic operations (e.g., an addition operation, such as a vector and/or matrix addition operation) on the two representations to generate the combined representation. In some cases, the difference model is configured to process the two representations using a trained machine learning model to generate the combined representation.

In some cases, the combination model and/or the encoder model is trained such that two or more successive combinations (e.g., additions) using one or more event and/or condition representations results in determination of a combined representation associated with: (i) multiple occurrences and/or an enhanced occurrence of the same event and/or condition, and/or (ii) occurrences of two or more events and/or conditions.

For example, if the combination model first processes a first scenario representation with a collision representation to determine a first combined representation and then processes the first combined representation with a rainy condition representation to determine a second combined representation, the second combined representation may represent a transformation of the first scenario representation to represent both a collision and a rainy condition. As another example, if the combination model first processes a first scenario representation with a collision representation to determine a first combined representation and then again processes the first combined representation with the collision representation to determine a second combined representation, the second combined representation may represent a transformation of the first scenario representation to represent two collisions. As another example, if the combination model first processes a first scenario representation with a rainy condition representation to determine a first combined representation and then again processes the first combined representation with the rainy condition representation to determine a second combined representation, the second combined representation may represent a transformation of the first scenario representation to represent a severe rainy condition. As another example, if the combination model first processes a first scenario representation with a rainy condition representation to determine a first combined representation, then again processes the first combined representation with the collision representation to determine a second combined representation, and then processes the second combined representation with a rainy condition representation to determine a third combined representation, the third combined representation may represent a transformation of the first scenario representation to represent a rainy condition and two collisions.

In some cases, the techniques described herein relate to a decoder model that is configured to process a representation (e.g., a scenario representation and/or a combined representation) to determine a synthetic driving scenario. The decoder model may be a trained machine learning model that is configured to process a representation to determine data associated with a synthetic driving scenario. In some cases, the decoder model includes the same layers as the encoder but in reverse order. In some cases, the decoder model is trained based on a loss function that is determined based on a deviation of the decoder's reconstruction of a driving scenario based on a representation of the driving scenario and the driving scenario itself.

In some cases, the techniques described herein relate to using an encoder model to perform one or more driving simulations. For example, the techniques described herein may include: (i) determining a first scenario representation based on a driving scenario and using the encoder model, (ii) combining the first representation and a representation corresponding to an event and/or condition to determine a second scenario representation, and (iii) providing the second representation to a simulation engine to perform one or more driving simulation operations based on the second representations. As another example, the techniques described herein may include: (i) determining a first scenario representation based on a driving scenario and using the encoder model, (ii) combining the first representation and a representation corresponding to an event and/or condition to determine a second scenario representation, and (iii) processing the second representation using a decoder model to generate a second driving scenario, and (iv) providing the second scenario to a simulation engine to perform one or more driving simulation operations based on the second representations. The driving simulation operation(s) may be configured to determine whether a vehicle controller associated with a simulated vehicle involved in the simulation is associated with one or more deficiencies.

In some cases, the techniques described herein relate to using an encoder model to perform one or more "triage" operations. A triage operation may include determining whether a scenario representation and/or a driving scenario involves a behavior (e.g., an undesirable driving behavior) by an object (e.g., a dynamic object) associated with the environment. For example, an example system may be configured to: (i) receive a first driving scenario, (ii) process the first scenario using an encoder model to determine a first scenario representation, and (iii) determining whether the first scenario representation involves an undesirable driving behavior. As another example, an example system may be configured to: (i) receive a first driving scenario, (ii) process the first scenario using an encoder model to determine a first scenario representation, (iii) processing the first scenario representation using a decoder model to determine a second driving scenario, and (iv) determining whether the second scenario involves an undesirable driving behavior. As another example, an example system may be configured to: (i) receive a first and a second driving scenario associated with a first and a second time respectively, (ii) determine a first and a second scenario representations for the first and second driving scenarios respectively, (iii) determine a modification representation based on the first and the second scenario representations, and (iv) determining whether the modification representation indicates occurrence of an event and/or condition between the first and the second times.

As another example, (ii) receive a first and a second driving scenarios that are different in that one of the two scenarios involves an event and/or condition while the other does not, (ii) determine a first and a second scenario representation for the first and second driving scenarios respectively, (iii) determine a first modification representation based on the first and the second scenario representations, (iv) receive a third and a fourth driving scenario, (v) determine a third and a fourth scenario representations for the third and the fourth driving scenarios respectively, (vii) determine a second modification representation based on the third and the fourth scenario representations, and (viii) determining whether at least one of the third scenario or the fourth scenario involves the event and/or condition based on whether a deviation associated with the first and the second modification representations exceeds a threshold. For example, in some cases, if the deviation fails to exceed the threshold, an example system may determine that at least one of the third scenario or the fourth scenario involves the event and/or condition of interest. However, if the deviation exceeds the threshold, the system may determine that neither the third scenario nor the fourth scenario involves the event and/or condition of interest.

In some cases, the techniques described herein relate to determining whether a vehicle's environment is experiencing an event and/or a condition using an encoder model. In some cases, a system may be configured to, during the operation of a vehicle, determine a modification representation between a pair of (e.g., consecutive) scenario representations. For example, the modification representation may be determined based on the scenario representation associated with the most-recent time at which sensor data associated with the vehicle's environment is obtained and sensor data associated with a time preceding that most recent-time (e.g., with a second-most recent-time at which sensor data associated with the vehicle's environment is obtained). In some cases, the system may be configured to determine whether the modification representation indicates the occurrence of an event and/or a condition. For example, the system may be configured to determine whether the deviation between the modification representation and a collision representation falls below a threshold. If the deviation falls below the threshold, the system may be configured to determine that the vehicle's environment is experiencing collision. The example system then may update a trajectory associated with the vehicle based on the collision detection (e.g., may modify the vehicle's trajectory to avoid the collision area, may bring the vehicle to a halt, may require manual control of the vehicle, and/or the like).

In some cases, the techniques described herein enhance the safety of autonomous vehicles by enabling rigorous evaluation of vehicle safety using simulation operation(s). In some cases, an example system may enable performing simulations based on scenario representation(s) to detect vehicle deficiencies. In some cases, a vehicle controller and/or a corresponding vehicle (e.g., a vehicle whose operations are being simulated by the vehicle controller) may only be validated if the simulated behavior of the vehicle controller does not indicate a deficiency. In some cases, the simulated trajectories generated in accordance with the techniques described herein enable more robust identification of vehicle deficiencies, as such techniques enable generated a more varied set of trajectories to test for a more varied set of behavioral and/or positional challenges.

In some cases, the techniques described herein improve the efficiency and speed of detecting vehicle deficiencies. Simulated testing is more efficient than real-world testing, because simulated testing can be performed while using less resources and faster. In some cases, by using parallel processing, multiple simulations may be performed at the same time, thus further increasing the speed and efficiency advantages associated with simulated testing for detecting vehicle deficiencies. Accordingly, the techniques described herein improve the efficiency and speed of detecting vehicle deficiencies by enabling such vehicle deficiency detection using simulated testing.

In some cases, the techniques described herein enhance the safety of autonomous vehicles by enabling detection of events and/or conditions such as collisions in vehicle environments. For example, in some cases, an example system may be configured to determine whether a vehicle is in an environment with a collision based on a deviation between: (i) a modification representation determined based on a scenario representation associated with a scenario corresponding to most-recent sensor data associated with the vehicle's environment and a scenario corresponding to older sensor data, and (ii) a collision representation. Detecting a collision in the vehicle environment enables modifying the trajectory of the vehicle to minimize the damage risk resulting from the detected collision. Accordingly, the techniques described herein enhance the safety of autonomous vehicles.

The techniques described herein may be implemented in a number of ways. Example implementations are provided below with reference to the following figures. Example implementations are discussed below in which the delivery vehicles are implemented as autonomous vehicles. However, the methods, apparatuses, and systems described herein may be applied to fully or partially autonomous delivery vehicles, robots, and/or robotic systems and are not limited to autonomous vehicles. Moreover, at least some of the techniques described herein may be utilized with driver-controlled vehicles and/or semi-autonomous vehicles. While various techniques described herein relate to simulated testing of vehicles and/or vehicles controllers, a person of ordinary skill in the relevant technology will recognize that the techniques described herein may be used in relation to real-world testing of vehicles and/or vehicle controllers.

FIG. 1 depicts an example environment 100 for determining a modified scenario representation based on a modification representation. As depicted in FIG. 1, the environment 100 includes an encoder model 110 and a combination model 114.

The encoder model 110 may be configured to process data associated with a driving scenario to determine a scenario representation associated with the driving scenario. For example, as depicted in FIG. 1, the encoder model 110 is configured to process data associated with the first driving scenario 102, which includes the vehicle 104, the vehicle 106, and the vehicle 108, to determine the first scenario representation 112. As depicted in FIG. 1, the first scenario representation 112 may be a vector.

The combination model 114 may be configured to process the first scenario representation 112 and the modification representation 116 to generate a second scenario representation 118. The second scenario representation 118 may represent a transformation of the first driving scenario 102 in accordance with an event and/or condition corresponding to the modification representation 116. The modification representation 116 may represent an event and/or a condition. For example, as depicted in FIG. 1, the modification representation 116 is a collision representation. In some cases, the modification representation 116 is a vector. In some cases, the modification representation 116 and the first scenario representation have the same dimensions (e.g., the same number of dimensions).

The combination model 114 may be configured to combine the first scenario representation 112 and the modification representation 116 to generate the second scenario representation 118. For example, the combination model 114 may be configured to determine the second scenario representation 118 by processing the first scenario representation 112 and the modification representation 116 using one or more arithmetic operations, such as an addition (e.g., a vector addition operation). As another example, the combination model 114 may be configured to determine the second scenario representation 118 by processing the first scenario representation 112 and the modification representation 116 using one or more trained machine learning layers. In some cases, the second scenario representation 118 is a vector. In some cases, the second scenario representation 118, the modification representation 116, and/or the first scenario representation have the same number of dimensions.

The second scenario representation 118 may be used to cause a system to perform one or more downstream tasks. For example, a scenario generation engine 120 may be configured to process the second scenario representation 118 to generate a synthetic driving scenario 128. The synthetic driving scenario 128 may result from transforming the first driving scenario 102 to integrate the event and/or condition that is associated with the modification representation 116 (e.g., to include a collision instance). For example, as depicted in FIG. 1, the synthetic driving scenario 128 includes a collision between the vehicle 104, the vehicle 106, and the vehicle 108. In some cases, to determine the synthetic driving scenario 128 based on the second scenario representation 118, a decoder model processes the second scenario representation 118. The decoder model may be trained based on scenario representations associated with real-world driving logs.

As another example, a simulation model 122 may process the second scenario representation 118 to perform one or more simulation operations. The simulation operation(s) may include generating the simulated behavior of one or more simulated objects (e.g., one or more simulated dynamic objects, such as one or more simulated vehicles) and determining a simulation outcome representing a behavior of a simulated vehicle controller given the simulated behavior(s). The simulation outcome may be used to determine whether the simulated vehicle controller is associated with one or more deficiencies.

As another example, a triage model 124 may process the second scenario representation 118 to determine whether the second scenario representation 118 represents one or more behaviors. For example, the triage model 124 may process the second scenario representation 118 to determine whether the second scenario representation 118 represents one or more undesirable driving behaviors. Examples of undesirable driving behaviors include running red lights, failure to yield, and dangerous sharp swerves, rapid acceleration and/or braking, driving past stop signs without a full-stope, wrong-way driving on ramps/one-ways, performing U-turns through medians, driving on the shoulder, cutting across parking lots, and/or the like. In some cases, to determine whether the second scenario representation 118 exhibits one or more undesirable behaviors, the triage model 124 may compare the second scenario representation 118 and/or a modification representation determined based on the first scenario representation 112 and the second scenario representation 118 to a library of representations for undesirable driving behaviors.

Figure 2:
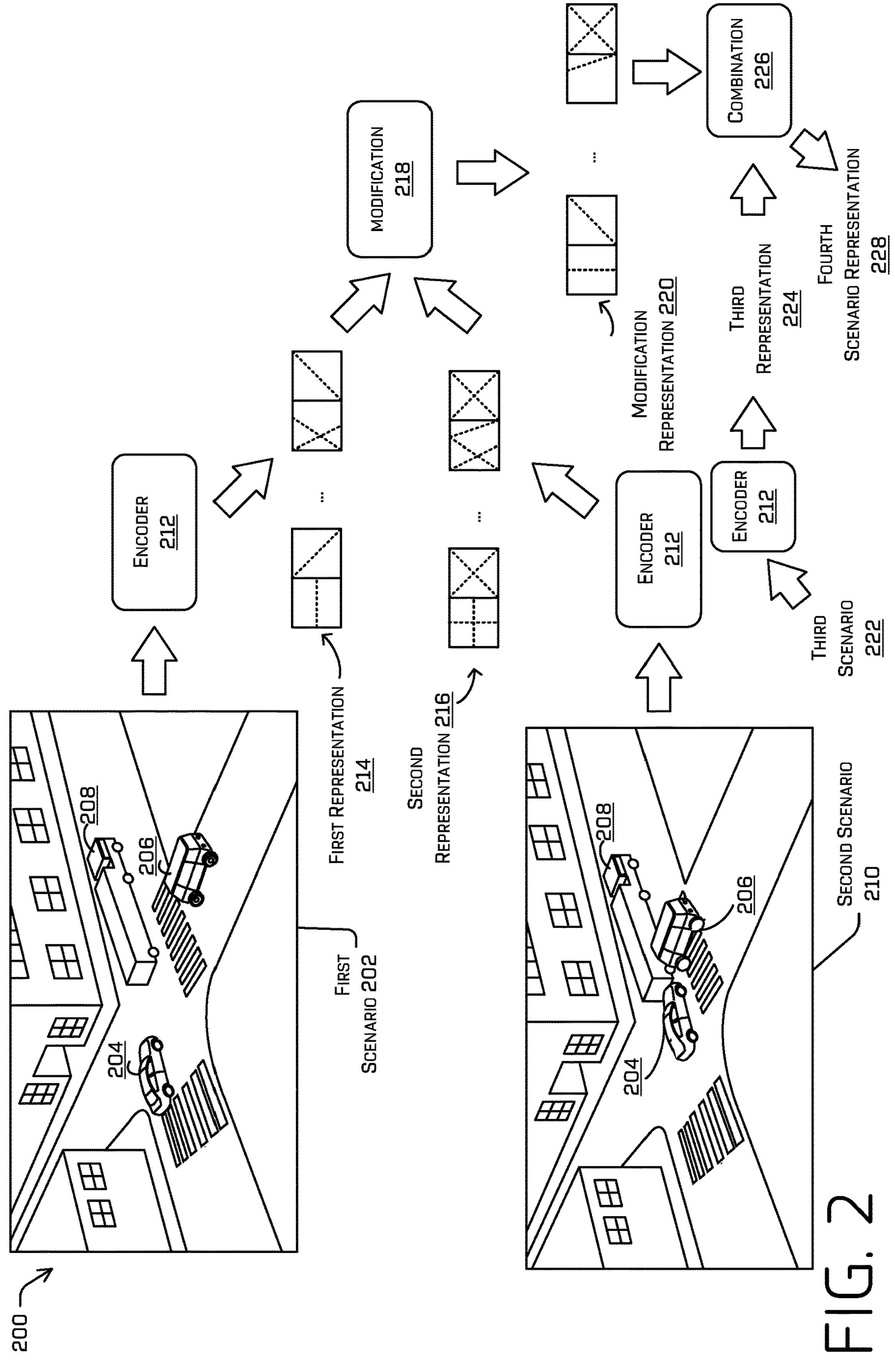
FIG. 2 depicts an example environment for transforming a driving scenario based on a difference associated with two other driving scenarios.

FIG. 2 depicts an example environment 200 for transforming a driving scenario based on a difference associated with two other driving scenarios. As depicted in FIG. 2, the environment 200 includes an encoder model 212, a difference model 218, and a combination model 226.

The encoder model 212 may be configured to process one or more driving scenarios to determine one or more scenario representations. For example, as depicted in FIG. 1, the encoder model 212 is configured to process the first driving scenario 202 to determine the first scenario representation 214, as well as to process the second driving scenario 210 to determine the second scenario representation 216. As further depicted in FIG. 1, the first driving scenario 202 and the second driving scenario 210 both includes the vehicle 204, the vehicle 206, and the vehicle 208. However, unlike in the first driving scenario 202, the second driving scenario 210 includes a collision involving the vehicle 204, the vehicle 206, and the vehicle 208. For example, the first driving scenario 202 may be determined based on sensor data (e.g., driving log data) captured in a particular environment at two times (e.g., a time t before a collision and at a time t+1 after the collision).

The difference model 218 is configured to process two representations (e.g., two scenario representations, a scenario representation and a modification representation, and/or the like) to determine the modification representation 220. The modification representation 220 may indicate one or more differences between the first driving scenario 202 represented by the first scenario representation 214 and the second driving scenario 210 represented by the second scenario representation 216. For example, because the first driving scenario 202 does not include a collision while the second driving scenario 210 includes a collision, the modification representation 220 may be a collision representation.

The difference model 218 may be configured to determine the modification representation 220 based on a difference between the first scenario representation 214 and the second scenario representation 216. For example, the difference model 218 may be configured to determine the modification representation 220 based on the output of performing an arithmetic operation (e.g., a subtraction operation, such as a vector subtraction operation) on the first scenario representation 214 and the second scenario representation 216. As another example, the difference model 218 may be configured to determine the modification representation 220 based on the output of processing the first scenario representation 214 and the second scenario representation 216 and/or processing a difference associated with the first scenario representation 214 and the second scenario representation 216 using one or more trained machine learning layers. In some cases, the first scenario representation 214, the second scenario representation 216, and/or the modification representation 220 are vectors. In some cases, the first scenario representation 214, the second scenario representation 216, and/or the modification representation 220 have the same number of dimensions.

The encoder model 212 may be further configured to process a third driving scenario 222 to determine a third scenario representation 224. The third scenario representation 224 may be a vector and/or may have the same number of dimensions as the first scenario representation 214, the second scenario representation 216, and/or the modification representation 220. In some cases, the third driving scenario 222 may be a driving scenario that is distinct from the first driving scenario 202 and the second driving scenario 210. In some cases, the third driving scenario 222 may be associated with a different time period, a different environment, and/or a different recording vehicle relative to the first driving scenario 202 and/or the second driving scenario 210. In some cases, the third driving scenario 222 may have no collisions.

The combination model 226 is configured to process the third scenario representation 224 and the modification representation 220 to determine the fourth scenario representation 228. The fourth scenario representation 228 may result from transforming the third scenario representation 224 to include a difference represented by the modification representation 220, which may represent a difference between the first scenario representation 214 and the second scenario representation 216. For example, if the modification representation 220 is a collision representation, the fourth scenario representation 228 may result from transforming the third scenario representation 224 to include a collision and/or a collision having the same severity as the collision represented by the modification representation 220 (e.g., the same severity as the collision between the vehicle 204, the vehicle 206, and the vehicle 208).

Once generated, the fourth scenario representation 228 may be used to perform synthetic scenario generation operations, simulation operations, triage operations, real-time collision detection operations, and/or the like. Aspects of these operations are described in greater detail above. The fourth scenario representation 228 may be a vector and/or may have the same number of dimensions as the first scenario representation 214, the second scenario representation 216, the modification representation 220, and/or the fourth scenario representation 228.

Figure 3:
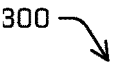
FIG. 3 is a flowchart diagram of an example process for training a scenario encoder model using difference loss function.
Figure 3:
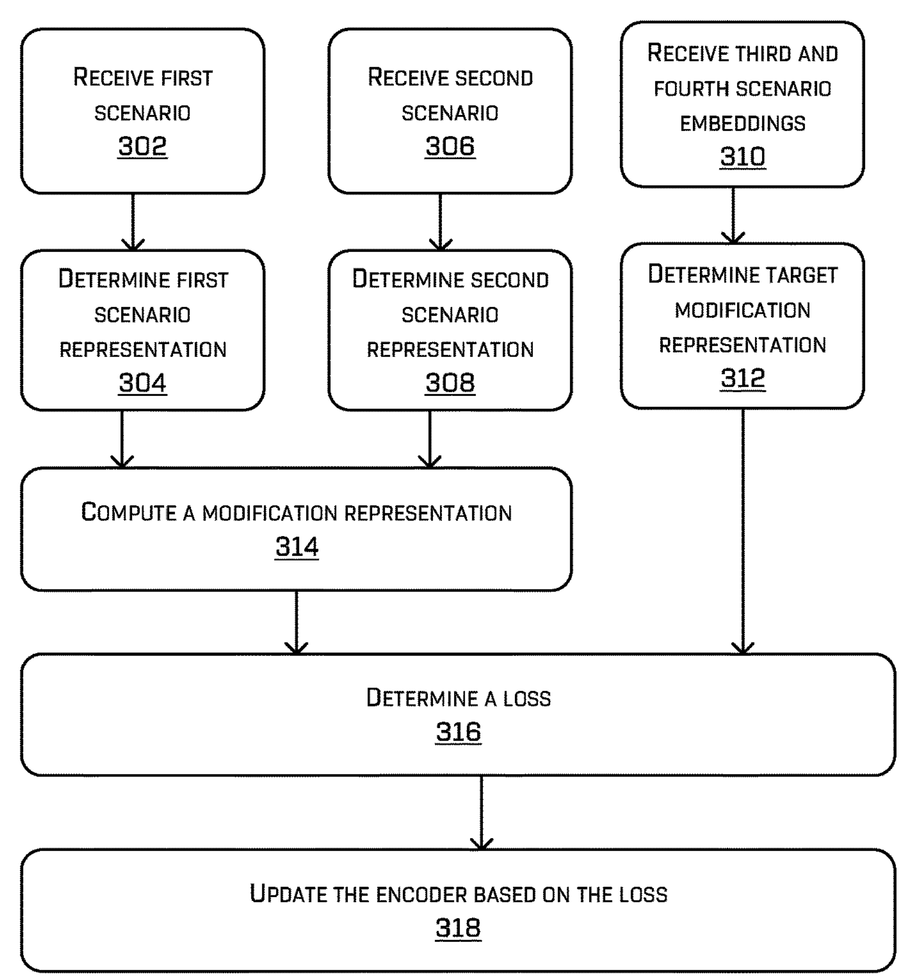

FIG. 3 is a flowchart diagram of an example process 300 for training a scenario encoder model using difference loss function. As depicted in FIG. 3, at operation 302, an example system receives a first driving scenario. The first driving scenario may represent one or more states and/or actions associated with one or more objects. The first driving scenario may be based on real-world log data and/or may be a synthetic scenario generated using one or more scenario generation operations.

At operation 304, the system determines a first scenario representation based on the first driving scenario. The system may process the first driving scenario using an encoder model to determine the first scenario representation. In some cases, prior to determining the first scenario representation, one or more parameters of the encoder model may be set to one or more initial values (e.g., one or more randomized values). In some cases, prior to determining the first scenario representation, one or more parameters of the encoder model may be set to value(s) determined using one or more prior training operations. The prior training operations may include updating the parameters based on one or more loss functions. Examples of such loss functions include: (i) a loss function that represents a deviation between the reconstruction of a driving scenario based on the scenario's representation as generated by the encoder model and the scenario itself, (ii) a loss function that represents a reconstruction of a second portion of a driving scenario based on the scenario's representation as generated by the encoder model and the scenario's second portion, and (iii) a loss function that represents a deviation between a modification representation associated with two scenario representations and a representation of the event and/or condition corresponding to the difference between the two scenario representations.

At operation 306, the system receives a second driving scenario. In some cases, the second driving scenario may represent a modification and/or transformation of the first driving scenario. In some cases, the second driving scenario may be associated with the same environment as the environment associated with the first driving scenario. However, the second driving scenario may be associated with a different (e.g., later) capturing time. In some cases, the second driving scenario includes an event and/or condition that is not present in the first driving scenario. The second driving scenario may represent one or more states and/or actions associated with one or more objects. The first driving scenario may be based on real-world log data and/or may be a synthetic scenario generated using one or more scenario generation operations.

At operation 308, the system determines a second scenario representation based on the second driving scenario. The system may process the second driving scenario using an encoder model to determine the second scenario representation.

At operation 310, the system receives a third scenario representation and a fourth scenario representation. The third scenario representation and the fourth representation may correspond to a third and a fourth driving scenario respectively. The third and fourth driving scenarios may differ at least in that the third driving scenario includes an event and/or condition of interest (e.g., a collision) while the fourth driving scenario does not. For example, the third driving scenario may be associated with a time before a collision while the fourth driving scenario may be associated with a time during and/or after the same collision. As another example, the third and fourth driving scenarios may be associated with different sets of log data.

At operation 312, the system determines a target modification representation. The target modification representation may be the representation of a difference associated with the third and the fourth driving scenarios. For example, the target modification representation may be generated by subtracting one of the third or fourth driving scenarios from the other.

At operation 314, the system computes a modification representation based on the first and the second scenario representations. In some cases, the system computes the modification representation based on the output of an arithmetic operation (e.g., a subtraction operation, such as a vector subtraction operation) performed on the first and the second scenario representations. In some cases, the system computes the modification representation based on the output of processing the two scenario representation using a trained machine learning model.

At operation 316, the system determines a loss function based on the target modification representation received at operation 310 and the computed modification representation determined at operation 312. The loss function may relate a deviation determined based on the target modification representation and the computed modification representation to one or more parameter values for one or more parameters of the encoder model and/or the difference model. The loss function may include at least one of a hinge loss function, a mean absolute error loss function, or a mean square error loss function.

At operation 318, the system updates one or more parameter values associated with the encoder model based on the loss function. In some cases, the system determines the parameter value(s) that decrease (e.g., locally and/or globally minimize) the loss function. In some cases, the system updates the parameter value(s) associated with the encoder model using a gradient descent routine, such as using gradient descent with backpropagation.

Figure 4:
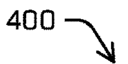
FIG. 4 is a flowchart diagram of an example process for training a scenario encoder model using a reconstruction loss function.
Figure 4:
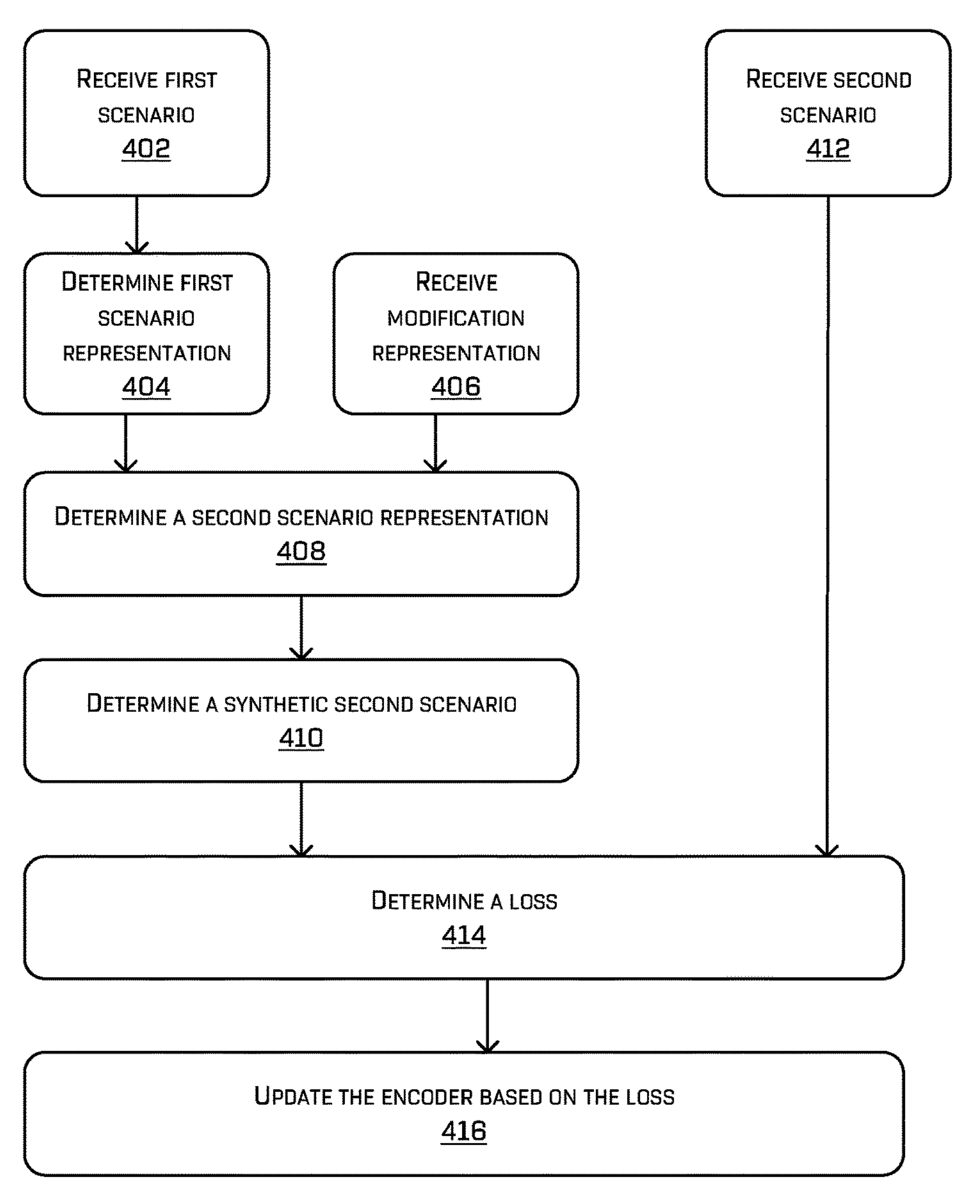

FIG. 4 is a flowchart diagram of an example process 400 for training a scenario encoder model using a reconstruction loss function. As depicted in FIG. 4, at operation 402, an example system receives a first driving scenario. The first driving scenario may represent one or more states and/or actions associated with one or more objects.

At operation 404, the system determines a first scenario representation based on the first driving scenario. In some cases, the system processes the first driving scenario using an encoder model to determine the first scenario representation.

At operation 406, the system receives a modification representation. The modification representation may represent a difference between the first driving scenario and a second driving scenario. For example, the modification representation may represent an event and/or a condition that occurs in one of the first and the second driving scenarios, but not in the other.

At operation 408, the system determines a second scenario representation based on the first scenario representation and the modification representation. For example, the system may determine the second scenario representation by performing an arithmetic operation (e.g., a summation operation, such as a vector summation operation) on the first scenario representation and the modification representation. As another example, the system may determine the second scenario representation by processing the first scenario representation and the modification representation using a trained machine learning model. The second scenario representation may represent a transformation of the first scenario representation based on an event and/or a condition associated with the modification representation.

At operation 410, the system determines a synthetic driving scenario based on the second scenario representation. In some cases, the system processes the second scenario representation using a decoder model to generate the synthetic driving scenario.

At operation 412, the system receives a second driving scenario. The second driving scenario may be different from the first driving scenario in accordance with a difference corresponding to the modification representation received at operation 406. For example, the second driving scenario may include an event and/or condition (e.g., a collision).

In some cases, the first and the second driving scenarios are both based on real-world logs. For example, the first driving scenario may be based on a real-world log associated with a vehicle's environment at a time prior to occurrence of an event and/or condition (e.g., prior to a collision), while the second driving scenario may be based on a real-world log associated with the vehicle's environment at a time after the occurrence of the event and/or condition.

At operation 414, the system determines a loss function based on the synthetic driving scenario determined at operation 410 and the second driving scenario received at operation 412. The loss function may relate a deviation determined based on comparing the synthetic driving scenario and the second driving scenario to one or more parameter values for one or more parameters of the encoder model and/or the difference model. The loss function may include at least one of a hinge loss function, a mean absolute error loss function, or a mean square error loss function. In some cases, comparing a first scenario and a second scenario may include: (i) computing a difference between one or more trajectories associated with the first scenario and one or more trajectories associated with the second scenario, (ii) a computing a difference between one or more features (e.g., classifications, velocities, accelerations, and/or the like) associated with one or more objects in the first scenario and one or more features associated with one or more objects in the second scenario, and/or (iii) computing a difference between one or more features (e.g., classifications, timings, and/or the like) associated with one or more events in the first scenario and one or more features associated with one or more events in the second scenario.

At operation 416, the system updates one or more parameter values associated with the encoder model and the decoder model based on the loss function. In some cases, the system determines the parameter value(s) that decrease (e.g., locally and/or globally minimize) the loss function. In some cases, the system updates the parameter value(s) associated with the encoder model using a gradient descent routine, such as using gradient descent with backpropagation.

Figure 5:
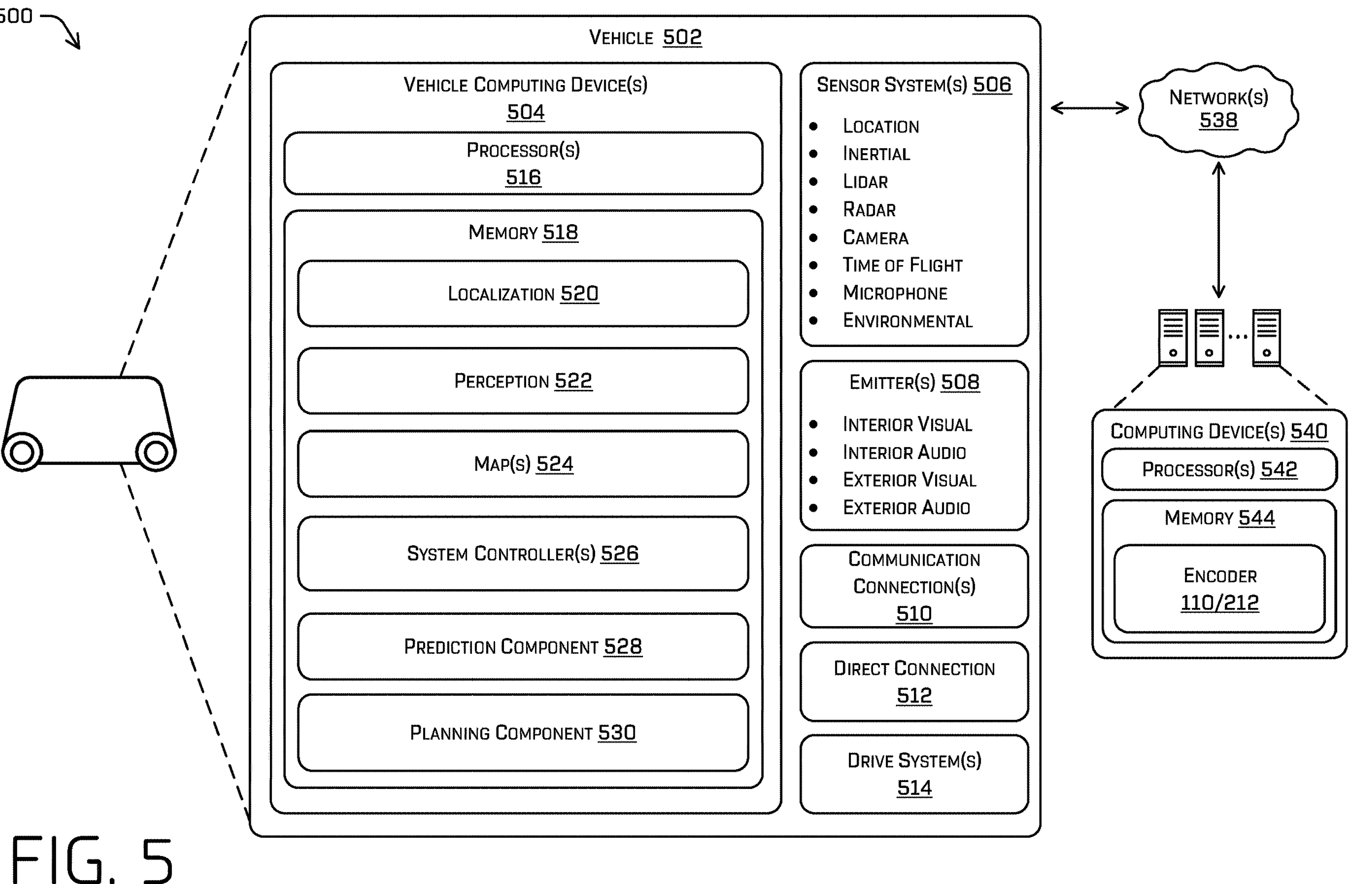
FIG. 5 depicts a block diagram of an example system for implementing various techniques described herein.

FIG. 5 depicts a block diagram of an example system 500 for implementing various techniques described herein. In some instances, the example system 500 may include vehicle 502 and one or more computing devices 540. In some instances, the vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 502 may be a fully or partially autonomous vehicle having any other level or classification. Moreover, in some instances, the techniques described herein may be usable by non-autonomous vehicles as well. These are merely examples, and the systems and methods described herein also may be incorporated into any ground-borne, airborne, or waterborne vehicle, including those ranging from vehicles that need to be manually controlled by a driver at all times, to those that are partially or fully autonomously controlled.

The vehicle 502 may include vehicle computing device(s) 504, sensor(s) 506, emitter(s) 508, network interface(s) 510, at least one direct connection 512 (e.g., for physically coupling with the vehicle to exchange data and/or to provide power), and one or more drive system(s) 514. The system 500 may additionally or alternatively comprise vehicle computing device(s) 504.

In some instances, the sensor(s) 506 may include lidar sensors, radar sensors, ultrasonic transducers, sonar sensors, location sensors (e.g., global positioning system (GPS), compass), inertial sensors (e.g., inertial measurement units (IMUs), accelerometers, magnetometers, gyroscopes,), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors,), etc.

The vehicle 502 may also include emitter(s) 508 for emitting light and/or sound, as described above. The vehicle 502 may also include network interface(s) 510 that enable communication between the vehicle 502 and one or more other local or remote computing device(s). The network interface(s) 510 may include physical and/or logical interfaces for connecting the vehicle computing device(s) 504 to another computing device or a network, such as network(s) 538.

In some instances, the vehicle 502 may include one or more drive systems(s) 514 (or drive components). In some instances, the vehicle 502 may have a single drive system 514. In some instances, the drive system(s) 514 may include one or more sensors to detect conditions of the drive system(s) 514 and/or the surroundings of the vehicle 502. By way of example and not limitation, the sensor(s) of the drive systems(s) 514 may include one or more wheel encoders (e.g., rotary encoders) to sense rotation of the wheels of the drive components, inertial sensors (e.g., inertial measurement units, accelerometers, gyroscopes, magnetometers) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive system(s) 514. In some cases, the sensor(s) on the drive system(s) 514 may overlap or supplement corresponding systems of the vehicle 502 (e.g., sensor(s) 506).‘

The drive systems(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.).

The vehicle computing device(s) 504 may include processor(s) 516 and memory 518 communicatively coupled with the one or more processors 516. Computing device(s) 540 may also include processor(s) 542, and/or memory 544. As described above, the memory 544 of the computing device(s) 540 may store operations associated with an encoder model.

The processor(s) 516 and/or 542 may be any suitable processor capable of executing instructions (e.g., computer-executable instructions) to process data and perform operations as described herein. By way of example and not limitation, the processor(s) 516 and/or 542 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 518 and/or 544 may be examples of non-transitory computer-readable media. Memory 518 and/or 544 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, memory 518 and/or memory 544 may store a localization component 520, perception component 522, maps 524, system controller(s) 526, prediction component 528, and/or planning component 530.

In at least one example, the localization component 520 may include hardware and/or software to receive data from the sensor(s) 506 to determine a position, velocity, and/or orientation of the vehicle 502 (e.g., one or more of an x-, y-, z-position, roll, pitch, or yaw).

Memory 518 may further include one or more maps 524 that may be used by the vehicle 502 to navigate within the environment. For the purpose of this discussion, a map may be any number of data structures modeled in two dimensions, three dimensions, or N-dimensions that may provide information about an environment, such as, but not limited to, topologies (such as intersections), streets, mountain ranges, roads, terrain, and the environment in general. In one example, a map may include a three-dimensional mesh generated using the techniques discussed herein. In some instances, the map may be stored in a tiled format, such that individual tiles of the map represent a discrete portion of an environment and may be loaded into working memory as needed. In at least one example, the one or more maps 524 may include at least one map (e.g., images and/or a mesh) generated in accordance with the techniques discussed herein. In some examples, the vehicle 502 may be controlled based at least in part on the maps 524. That is, the maps 524 may be used in connection with the localization component 520, the perception component 522, and/or the planning component 530 to determine a location of the vehicle 502, identify objects in an environment, and/or generate routes and/or trajectories to navigate within an environment.

In some instances, the perception component 522 may comprise a primary perception system and/or a prediction system implemented in hardware and/or software. In some examples, sensor data and/or perception data may be used to generate an environment state that represents a current state of the environment. For example, the environment state may be a data structure that identifies object data (e.g., object position, area of environment occupied by object, object heading, object velocity, historical object data), environment layout data (e.g., a map or sensor-generated layout of the environment), environment condition data (e.g., the location and/or area associated with environmental features, such as standing water or ice, whether it's raining, visibility metric), sensor data (e.g., an image, point cloud), etc. In some examples, the environment state may include a top-down two-dimensional representation of the environment and/or a three-dimensional representation of the environment, either of which may be augmented with object data. In yet another example, the environment state may include sensor data alone. In yet another example, the environment state may include sensor data and perception data together.

Prediction component 528 may include functionality to generate predicted information associated with objects in an environment.

The planning component 530 may receive a location and/or orientation of the vehicle 502 from the localization component 520, perception data from the perception component 522, and/or predicted trajectories from the prediction component 528 and may determine instructions for controlling operation of the vehicle 502 based at least in part on any of this data.

Memory 518 and/or 544 may additionally or alternatively store a mapping system (e.g., generating a map based at least in part on sensor data), a planning system, a ride management system, etc. Although localization component 520, perception component 522, the prediction component 528, the planning component 530, and/or system controller(s) 526 are illustrated as being stored in memory 518, any of these components may include processor-executable instructions, machine-learned model(s) (e.g., a neural network), and/or hardware and all or part of any of these components may be stored on memory 544 or configured as part of computing device(s) 540.

As described herein, the localization component 520, the perception component 522, the prediction component 528, the planning component 530, and/or other components of the system 500 may comprise one or more ML models. For example, the localization component 520, the perception component 522, the prediction component 528, and/or the planning component 530 may each comprise different ML model pipelines. The prediction component 528 may use a different ML model or a combination of different ML models in different circumstances. For example, the prediction component 528 may use different GNNs, RNNs, CNNs, MLPs and/or other neural networks tailored to outputting predicted object trajectories in different seasons (e.g., summer or winter), different driving conditions and/or visibility conditions (e.g., times when border lines between road lanes may not be clear or may be covered by snow), and/or based on different crowd or traffic conditions (e.g., more conservative trajectories in a crowded traffic conditions such as downtown areas, etc.). In various examples, any or all the above ML models may comprise an attention mechanism, GNN, and/or any other neural network. An exemplary neural network is a biologically inspired algorithm which passes input data through a series of connected layers to produce an output. Each layer in a neural network may also comprise another neural network or may comprise any number of layers (whether convolutional or not). As may be understood in the context of this disclosure, a neural network may utilize machine-learning, which may refer to a broad class of such algorithms in which an output is generated based on learned parameters.

Although discussed in the context of neural networks, any type of machine-learning may be used consistent with this disclosure. For example, machine-learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 518 may additionally or alternatively store one or more system controller(s) 526, which may be configured to control steering, propulsion, braking, safety, emitters, communication, and other systems of the vehicle 502. These system controller(s) 526 may communicate with and/or control corresponding systems of the drive systems(s) 514 and/or other components of the vehicle 502.

In an additional or alternate example, vehicle 502 and/or computing device(s) 540 may communicate (e.g., transmit and/or receive messages over network(s) 538) with one or more passenger devices (not shown). A passenger device may include, for example, a smart phone, portable computer such as a laptop or tablet, wearable device (e.g., smart glasses, smart watch, earpiece), and/or the like. Although a passenger device may be a device associated with a passenger that is discrete from device(s) of the autonomous vehicle, it is contemplated that the passenger device may be a sub-system and/or a device of the vehicle 502. For example, the passenger device may additionally or alternatively comprise a display and/or one or more input/output devices, such as a touchscreen, microphone, speaker, and/or the like. In some examples, the vehicle 502 may transmit messages and/or receive messages from the passenger device.

It should be noted that while FIG. 5 is illustrated as a distributed system, in alternative examples, components of the vehicle 502 may be associated with the computing device(s) 540 and/or components of the computing device(s) 540 may be associated with the vehicle 502. That is, the vehicle 502 may perform one or more of the functions associated with the computing device(s) 540, and vice versa.

Conclusion

While one or more examples of the techniques described herein have been described, various alterations, additions, permutations, and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples. For example, the components and instructions of FIG. 5 may utilize the processes and flows of FIGS. 1-4.

A non-limiting list of objects may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

EXAMPLE CLAUSES

While the example clauses described below are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

A: A system comprising: one or more processors; and one or more non-transitory computer-readable media storing computer-executable instructions that, when executed, cause the one or more processors to perform operations comprising: receiving a first driving scenario; receiving a second driving scenario; providing the first driving scenario and the second driving scenario to a first model; receiving, from the first model, a first representation associated with the first driving scenario and a second representation associated with the second driving scenario; determining a modification representation representing a difference measure associated with the first representation and the second representation; training the first model based at least in part on the modification representation; and providing the first model to a second system, wherein the second system is configured to: modify a third driving scenario based at least in part on the first model to determine a fourth driving scenario, and control a vehicle based at least in part the fourth driving scenario.

B: The system of paragraph A, wherein training the first model comprises: providing the modification representation to a second model; receiving, from the second model, a fifth driving scenario; determining a loss function based at least in part on the fifth driving scenario; and training the first model based at least in part on the loss function.

C: The system of paragraph A or B, wherein modifying the third driving scenario comprises: providing the third driving scenario to the first model; receiving, from the first model, a third representation associated with the third driving scenario; and determining a combined representation representing an aggregation of the modification representation and the third representation.

D: The system of any of paragraphs A-C, wherein the modification representation is a first modification representation and wherein training the first model comprises: receiving a second modification representation associated with two additional scenarios; determining a loss based at least in part on a difference between the modification representation and the second modification representation; and training the first model based at least in part on the loss.

E: The system of any of paragraphs A-D, wherein the first representation and the modification representation are associated with a same dimensionality.

F: One or more non-transitory computer-readable media storing instructions executable by one or more processors, wherein the instructions, when executed, cause the one or more processors to perform operations comprising: receiving a first driving scenario; providing the first driving scenario to a first model; receiving a first representation of the first driving scenario from the first model; receiving a second representation associated with a modification to the first driving scenario; determining, based at least in part on aggregating the first representation with the second representation, a third representation; and at least one of: determining a second driving scenario based at least in part on the third representation, or training a second model based at least in part on at least one of the second representation or the third representation.

G: The one or more non-transitory computer-readable media of paragraph F, further comprising controlling a simulated vehicle associated with the second driving scenario.

H: The one or more non-transitory computer-readable media of paragraph F or G, wherein the second representation is associated with at least one of: a behavior associated with at least one of a first vehicle or a first object represented by the first driving scenario, a collision associated with at least one of the first vehicle or the first object, or a shift in a position associated with at least one of the first vehicle or the first object.

I: The one or more non-transitory computer-readable media of any of paragraphs F-H, wherein determining the second driving scenario comprises: providing the third representation to a second model; and receiving the second driving scenario from the second model.

J: The one or more non-transitory computer-readable media of any of paragraphs F-I, wherein: the first driving scenario represents a first feature associated with a first object at a first time, a second feature associated with a second object at the first time, a third feature associated with the first object at a second time, and a fourth feature associated with the second object at the second time, and the second representation is determined based at least in part on a difference associated with at least one of the first feature, the second feature, the third feature, or the fourth feature.

K: The one or more non-transitory computer-readable media of any of paragraphs F-J, the operations further comprising: receiving a third driving scenario and a fourth driving scenario; providing the third driving scenario and the fourth driving scenario to the first model; receiving, from the first model, a fourth representation associated with the third driving scenario and a fifth representation associated with the fourth driving scenario; determining a sixth representation representing a difference associated with the fourth representation and the fifth representation; and determining a loss based at least in part on the sixth representation and the second representation.

L: The one or more non-transitory computer-readable media of any of paragraphs F-K, wherein: the first driving scenario is a real-world scenario that is collision-free, and the second driving scenario is a synthetic scenario that is associated with a collision.

M: The one or more non-transitory computer-readable media of any of paragraphs F-L, the operations further comprising: determining a simulation outcome based at least in part on the second driving scenario; and determining a deficiency associated with a simulated vehicle controller based at least in part on the simulation outcome.

N: A method comprising: receiving a first driving scenario; providing the first driving scenario to a first model; receiving a first representation of the first driving scenario from the first model; receiving a second representation associated with a modification to the first driving scenario; determining, based at least in part on aggregating the first representation with the second representation, a third representation; and at least one of: determining a second driving scenario based at least in part on the third representation, or training a second model based at least in part on at least one of the second representation or the third representation.

O: The method of paragraph N, further comprising controlling a simulated vehicle associated with the second driving scenario.

P: The method of paragraph N or O, wherein the second representation is associated with at least one of: a behavior associated with at least one of a first vehicle or a first object represented by the first driving scenario, a collision associated with at least one of the first vehicle or the first object, or a shift in a position associated with at least one of the first vehicle or the first object.

Q: The method of any of paragraphs N-P, wherein determining the second driving scenario comprises: providing the third representation to a second model; and receiving the second driving scenario from the second model.

R: The method of any of paragraphs N-Q, wherein: the first driving scenario represents a first feature associated with a first object at a first time, a second feature associated with a second object at the first time, a third feature associated with the first object at a second time, and a fourth feature associated with the second object at the second time, and the second representation is determined based at least in part on a difference associated with at least one of the first feature, the second feature, the third feature, or the fourth feature.

S: The method of any of paragraphs N-R, further comprising: receiving a third driving scenario and a fourth driving scenario; providing the third driving scenario and the fourth driving scenario to the first model; receiving, from the first model, a fourth representation associated with the third driving scenario and a fifth representation associated with the fourth driving scenario; determining a sixth representation representing a difference associated with the fourth representation and the fifth representation; and determining a loss based at least in part on the sixth representation and the second representation.

T: The method of any of paragraphs N-S, wherein: the first driving scenario is a real-world scenario that is collision-free, and the second driving scenario is a synthetic scenario that is associated with a collision.

The invention claimed is:

1. A system comprising:

one or more processors; and one or more non-transitory computer-readable media storing computer-executable instructions that, when executed, cause the one or more processors to perform operations comprising:

receiving a first driving scenario;

receiving a second driving scenario;

providing the first driving scenario and the second driving scenario to a first model;

receiving, from the first model, a first representation associated with the first driving scenario and a second representation associated with the second driving scenario;

determining a modification representation representing a difference measure associated with the first representation and the second representation;

training the first model based at least in part on the modification representation; and providing the first model to a second system, wherein the second system is configured to:

modify a third driving scenario based at least in part on the first model to determine a fourth driving scenario, wherein modifying the third driving scenario comprises:

providing the third driving scenario to the first model;

receiving, from the first model, a third representation associated with the third driving scenario; and determining a combined representation representing an aggregation of the modification representation and the third representation, and control a vehicle based at least in part on the fourth driving scenario.

2. The system of claim 1, wherein training the first model comprises:

providing the modification representation to a second model;

receiving, from the second model, a fifth driving scenario;

determining a loss function based at least in part on the fifth driving scenario; and training the first model based at least in part on the loss function.

3. The system of claim 1, wherein the modification representation is a first modification representation and wherein training the first model comprises:

receiving a second modification representation associated with two additional scenarios;

determining a loss based at least in part on a difference between the modification representation and the second modification representation; and training the first model based at least in part on the loss.

4. The system of claim 1, wherein the first representation and the modification representation are associated with a same dimensionality.

5. One or more non-transitory computer-readable media storing instructions executable by one or more processors, wherein the instructions, when executed, cause the one or more processors to perform operations comprising:

receiving a first driving scenario;

providing the first driving scenario to a first model;

receiving a first representation of the first driving scenario from the first model;

receiving a second representation associated with a modification to the first driving scenario;

determining, based at least in part on aggregating the first representation with the second representation, a third representation;

determining a second driving scenario based at least in part on the third representation;

determining a simulation outcome based at least in part on the second driving scenario; and determining a deficiency associated with a simulated vehicle controller based at least in part on the simulation outcome.

6. The one or more non-transitory computer-readable media of claim 5, further comprising controlling a simulated vehicle associated with the second driving scenario.

7. The one or more non-transitory computer-readable media of claim 5, wherein the second representation is associated with at least one of:

a behavior associated with at least one of a first vehicle or a first object represented by the first driving scenario, a collision associated with at least one of the first vehicle or the first object, or a shift in a position associated with at least one of the first vehicle or the first object.

8. The one or more non-transitory computer-readable media of claim 5, wherein determining the second driving scenario comprises:

providing the third representation to a second model; and receiving the second driving scenario from the second model.

9. The one or more non-transitory computer-readable media of claim 5, wherein:

the first driving scenario represents a first feature associated with a first object at a first time, a second feature associated with a second object at the first time, a third feature associated with the first object at a second time, and a fourth feature associated with the second object at the second time, and the second representation is determined based at least in part on a difference associated with at least one of the first feature, the second feature, the third feature, or the fourth feature.

10. The one or more non-transitory computer-readable media of claim 5, the operations further comprising:

receiving a third driving scenario and a fourth driving scenario;

providing the third driving scenario and the fourth driving scenario to the first model;

receiving, from the first model, a fourth representation associated with the third driving scenario and a fifth representation associated with the fourth driving scenario;

determining a sixth representation representing a difference associated with the fourth representation and the fifth representation; and determining a loss based at least in part on the sixth representation and the second representation.

11. The one or more non-transitory computer-readable media of claim 5, wherein:

the first driving scenario is a real-world scenario that is collision-free, and the second driving scenario is a synthetic scenario that is associated with a collision.

12. The one or more non-transitory computer-readable media of claim 5, the operations further comprising:

training a second model based at least in part on at least one of the second representation or the third representation.

13. A method comprising:

receiving a first driving scenario;

providing the first driving scenario to a first model;

receiving a first representation of the first driving scenario from the first model;

receiving a second representation associated with a modification to the first driving scenario;

determining, based at least in part on aggregating the first representation with the second representation, a third representation;

determining a second driving scenario based at least in part on the third representation;

determining a simulation outcome based at least in part on the second driving scenario; and determining a deficiency associated with a simulated vehicle controller based at least in part on the simulation outcome.

14. The method of claim 13, further comprising controlling a simulated vehicle associated with the second driving scenario.

15. The method of claim 13, wherein the second representation is associated with at least one of:

a behavior associated with at least one of a first vehicle or a first object represented by the first driving scenario, a collision associated with at least one of the first vehicle or the first object, or a shift in a position associated with at least one of the first vehicle or the first object.

16. The method of claim 13, wherein determining the second driving scenario comprises:

providing the third representation to a second model; and receiving the second driving scenario from the second model.

17. The method of claim 13, wherein:

the first driving scenario represents a first feature associated with a first object at a first time, a second feature associated with a second object at the first time, a third feature associated with the first object at a second time, and a fourth feature associated with the second object at the second time, and the second representation is determined based at least in part on a difference associated with at least one of the first feature, the second feature, the third feature, or the fourth feature.

18. The method of claim 13, further comprising:

receiving a third driving scenario and a fourth driving scenario;

providing the third driving scenario and the fourth driving scenario to the first model;

receiving, from the first model, a fourth representation associated with the third driving scenario and a fifth representation associated with the fourth driving scenario;

determining a sixth representation representing a difference associated with the fourth representation and the fifth representation; and determining a loss based at least in part on the sixth representation and the second representation.

19. The method of claim 13, wherein:

the first driving scenario is a real-world scenario that is collision-free, and the second driving scenario is a synthetic scenario that is associated with a collision.

20. The method of claim 13, further comprising:

training a second model based at least in part on at least one of the second representation or the third representation.

* * * * *